United States Patent
Kim et al.

(10) Patent No.: US 12,538,337 B2
(45) Date of Patent: Jan. 27, 2026

(54) METHOD AND APPARATUS FOR SIDELINK COMMUNICATION IN UNLICENSED BAND

(71) Applicant: ELECTRONICS AND TELECOMMUNICATIONS RESEARCH INSTITUTE, Daejeon (KR)

(72) Inventors: Jun Hyeong Kim, Daejeon (KR); Go San Noh, Daejeon (KR); Il Gyu Kim, Daejeon (KR); Man Ho Park, Daejeon (KR); Nak Woon Sung, Daejeon (KR); Jae Su Song, Daejeon (KR); Nam Suk Lee, Daejeon (KR); Hee Sang Chung, Daejeon (KR); Min Suk Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 309 days.

(21) Appl. No.: 18/373,389

(22) Filed: Sep. 27, 2023

(65) Prior Publication Data
US 2024/0121809 A1 Apr. 11, 2024

(30) Foreign Application Priority Data

Sep. 30, 2022 (KR) .................. 10-2022-0125332
Sep. 27, 2023 (KR) .................. 10-2023-0131039

(51) Int. Cl.
*H04W 28/02* (2009.01)
*H04W 72/40* (2023.01)
*H04W 72/541* (2023.01)

(52) U.S. Cl.
CPC ......... *H04W 72/40* (2023.01); *H04W 72/541* (2023.01)

(58) Field of Classification Search
CPC ............... H04W 72/51; H04W 72/566; H04W 72/0457; H04W 72/25; H04W 72/563;
(Continued)

(56) References Cited

U.S. PATENT DOCUMENTS 11,483,864 B2   10/2022   Xue et al.
11,902,940 B2 *  2/2024   Li ........................... H04W 4/40
(Continued)

OTHER PUBLICATIONS

ETRI, "Discussion on physical channel design framework for SL-U", 3GPP TSG RAN WG1 Meeting #110bis-e, R1-2209405, e-Meeting, Oct. 10-19, 2022.
(Continued)

*Primary Examiner* — Phuoc H Doan
(74) *Attorney, Agent, or Firm* — LRK PATENT LAW FIRM

(57) ABSTRACT

A method of a first terminal may include: identifying first RB set(s) to be used for SL communication among consecutive RB sets through an LBT procedure; identifying a first subchannel group included in the first RB set(s) and a second subchannel group including a first PRB in the first RB set(s), the first PRB being not included in the first subchannel group; configuring the first PRB within the second subchannel group as an SL communication resource; and transmitting, to a second terminal, control information indicating that the first PRB is configured as the SL communication resource.

20 Claims, 17 Drawing Sheets

(58) Field of Classification Search
CPC ..... H04W 72/40; H04W 72/20; H04W 24/08; H04W 72/23; H04W 4/40; H04L 5/0005; H04L 5/0032
See application file for complete search history.

(56) References Cited

U.S. PATENT DOCUMENTS

| | | |
|---|---|---|
| 2021/0105815 A1 | 4/2021 | Salem |
| 2021/0243804 A1 | 8/2021 | Do et al. |
| 2021/0360617 A1 | 11/2021 | Jia et al. |
| 2022/0046594 A1 | 2/2022 | Lee et al. |
| 2022/0061029 A1 | 2/2022 | Lee et al. |
| 2022/0201711 A1 | 6/2022 | Lee et al. |
| 2022/0407658 A1 | 12/2022 | Hwang et al. |
| 2023/0300815 A1* | 9/2023 | Li ........................ H04L 1/1854 |

OTHER PUBLICATIONS

LG Electronics, "Discussion on physical channel design framework for sidelink on unlicensed spectrum", 3GPP TSG RAN WG1 Meeting #110, R1 220 5851, Toulouse, France, Aug. 22, 26, 2022.

\* cited by examiner

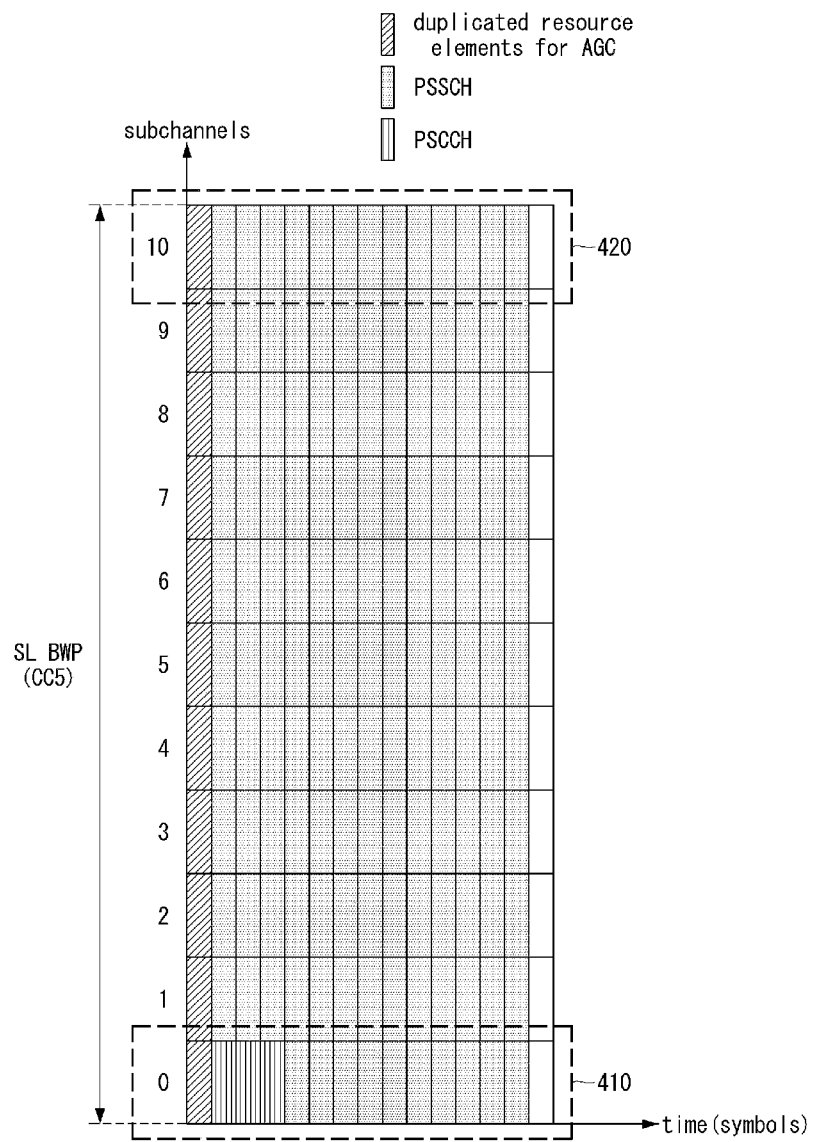

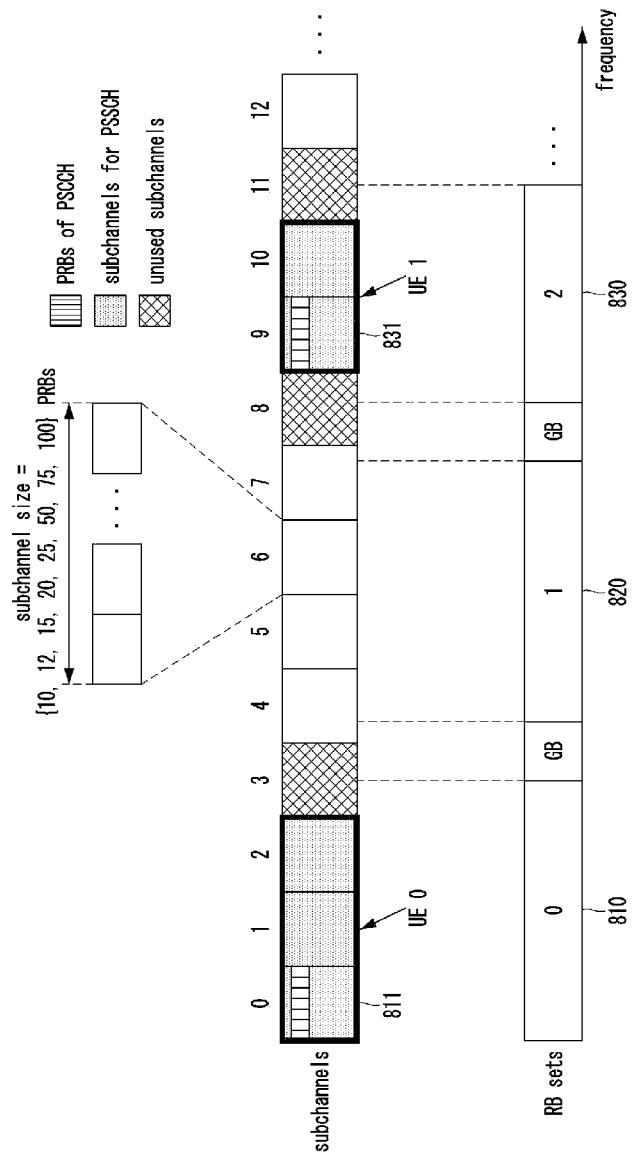

METHOD AND APPARATUS FOR SIDELINK COMMUNICATION IN UNLICENSED BAND

CROSS-REFERENCE TO RELATED APPLICATIONS

This application claims priority to Korean Patent Applications No. 10-2022-0125332, filed on Sep. 30, 2022, and No. 10-2023-0131039, filed on Sep. 27, 2023, with the Korean Intellectual Property Office (KIPO), the entire contents of which are hereby incorporated by reference.

BACKGROUND

1. Technical Field

Exemplary embodiments of the present disclosure relate to a sidelink communication technique, and more specifically, to a sidelink communication technique in an unlicensed band.

2. Description of Related Art

Vehicle-to-Everything (V2X) is a communication technology for exchanging various information including traffic information with other vehicles and other infrastructures such as roads through wired/wireless networks. The V2X includes communication between vehicles (Vehicle-to-Vehicle, V2V), communication between a vehicle and a road infrastructure/network (Vehicle-to-Infrastructure/Network, V2I/N), and communication between a vehicle and a pedestrian (Vehicle-to-Pedestrian, V2P). As an example of V2X communication services, vehicles within a certain range can exchange their own location/speed information and surrounding traffic situation information through V2V communication to prevent sudden traffic accidents, or a platoon driving service can be provided in which a plurality of vehicles connected through V2V communication drive in a convoy on a highway. In addition, by providing high-speed wireless backhaul services to vehicles through V2I/N communication, users in the vehicles can use high-speed Internet services and drive/control the vehicles remotely using V2I/N wireless networks.

Meanwhile, active sidelink standardization activities are underway in the release-18 (Rel-18) of the $3^{rd}$ generation partnership project (3GPP). Starting at the RAN1 #109-e meeting in May 2022, the standardization activity for a 3GPP's Rel-18 sidelink work item ('NR sidelink evolution') has begun. The work item includes standardization efforts for supporting sidelink operations in unlicensed bands, and it encompasses the following two standardization items.

The first standardization item is an unlicensed band sidelink channel access mechanism (design baseline: NR-U channel access mechanism). The second standardization item is design of unlicensed band sidelink physical channels.

Accordingly, unlicensed communication methods for satisfying the above-described work items for unlicensed band sidelink communication are required.

SUMMARY

Exemplary embodiments of the present disclosure are directed to providing an unlicensed band sidelink communication method.

According to a first exemplary embodiment of the present disclosure, a method of a first terminal may comprise: identifying first resource block (RB) set(s) to be used for sidelink (SL) communication among consecutive RB sets through a Listen-Before-Talk (LBT) procedure; identifying a first subchannel group included in the first RB set(s) and a second subchannel group including a first physical resource block (PRB) in the first RB set(s), the first PRB being not included in the first subchannel group; configuring the first PRB within the second subchannel group as an SL communication resource; and transmitting, to a second terminal, control information indicating that the first PRB is configured as the SL communication resource.

The control information may be at least one of first-stage sidelink control information (SCI1), second-stage SCI (SCI2), or a medium access control (MAC) control element (CE).

When neighboring terminal(s) including the second terminal do not reserve the second subchannel group, the first PRB may be configured as the SL communication resource.

The method may further comprise: transmitting one or more transport blocks (TBs) in consecutive slots.

A demodulation reference signal (DMRS) allocated to the first PRB may have a same pattern as a pattern of a DMRS allocated to a PRB in which a physical sidelink control channel (PSCCH) is not transmitted in the first subchannel group.

The method may further comprise: when the first RB set(s) include two or more consecutive RB sets, allocating a third subchannel group including at least a portion of a guard band (GB) included within the first RB set(s) as the SL communication resource, wherein the control information further indicates that the third subchannel group is allocated as the SL communication resource.

When a PSCCH is transmitted in the third subchannel group, the PSCCH may be transmitted in PRB(s) not belonging to the GB.

The control information may further indicate a position of a starting symbol of SL transmission in a slot in which SL transmission is performed.

When the SL transmission is performed in two or more slots, the control information may further indicate that a PSCCH or DMRS is transmitted at a position of a last symbol of a first slot and a position of a first symbol of a second slot.

According to a second exemplary embodiment of the present disclosure, a method of a second terminal may comprise: receiving, from a first terminal, control information including information on an sidelink (SL) communication resource; and receiving SL data from the first terminal based on the control information, wherein the information on the SL communication resource indicates a first subchannel group and a first physical resource block (PRB) within a second subchannel group; the first subchannel group is a subchannel included in first resource block (RB) set(s) in which communication is identified to be possible by the first terminal through a Listen-Before-Talk (LBT) procedure; and the second subchannel group is a subchannel including a first PRB in the first RB set(s), the first PRB being not included in the first subchannel group.

The control information may be at least one of first-stage sidelink control information (SCI1), second-stage SCI (SCI2), or a medium access control (MAC) control element (CE).

The method may further comprise: receiving one or more transport blocks (TBs) in consecutive slots.

A demodulation reference signal (DMRS) allocated to the first PRB may have a same pattern as a pattern of a DMRS allocated to a PRB in which a physical sidelink control channel (PSCCH) is not transmitted in the first subchannel group.

The control information may further indicate that a third subchannel is allocated as the SL communication resource, and the third subchannel may be a subchannel including at least a portion of a guard band (GB) included within the first RB set(s) when the first RB set(s) includes two or more consecutive RB sets.

When a PSCCH is transmitted in the third subchannel, the PSCCH may be transmitted in PRB(s) not belonging to the GB.

The control information may further indicate a position of a starting symbol where SL symbols are transmitted in a slot where the SL symbols are transmitted.

According to a third exemplary embodiment of the present disclosure, a first terminal may comprise a processor, and the processor may cause the first terminal to perform: identifying first resource block (RB) set(s) to be used for sidelink (SL) communication among consecutive RB sets through a Listen-Before-Talk (LBT) procedure; identifying a first subchannel group included in the first RB set(s) and a second subchannel group including a first physical resource block (PRB) in the first RB set(s), the first PRB being not included in the first subchannel group; configuring the first PRB within the second subchannel group as an SL communication resource; and transmitting, to a second terminal, control information indicating that the first PRB is configured as the SL communication resource.

A demodulation reference signal (DMRS) allocated to the first PRB may have a same pattern as a pattern of a DMRS allocated to a PRB in which a physical sidelink control channel (PSCCH) is not transmitted in the first subchannel group.

The processor may further cause the first terminal to perform: when the first RB set(s) include two or more consecutive RB sets, allocating a third subchannel group including at least a portion of a guard band (GB) included within the first RB set(s) as the SL communication resource, wherein the control information further indicates that the third subchannel group is allocated as the SL communication resource.

The processor may further cause the first terminal to perform: when a PSCCH is transmitted in the third subchannel group, transmitting the PSCCH in PRB(s) not belonging to the GB.

According to an exemplary embodiment of the present disclosure, a resource allocation structure is provided that allows a sidelink terminal to more efficiently perform sidelink communication in an unlicensed band. In addition, related procedures and signaling methods required when using the structure according to an exemplary embodiment of the present disclosure are provided.

BRIEF DESCRIPTION OF DRAWINGS

FIG. 4A is a conceptual diagram illustrating a case where 11 subchannels constitute a bandwidth part in sidelink.

FIG. 8A is a conceptual diagram illustrating a method of allocating resources in the frequency domain in a sidelink unlicensed band.

DETAILED DESCRIPTION OF THE EMBODIMENTS

Figure 1:
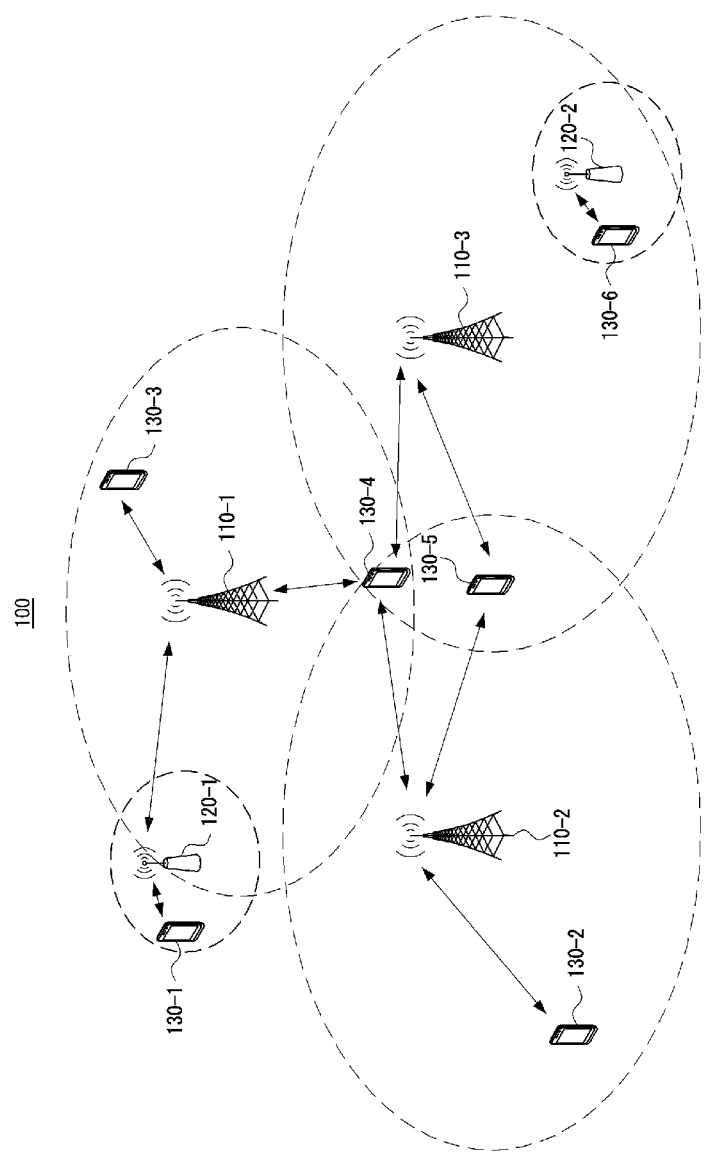
FIG. 1 is a conceptual diagram illustrating a first exemplary embodiment of a communication system.

While the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above as well as the frequency band of 6 GHz or below.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
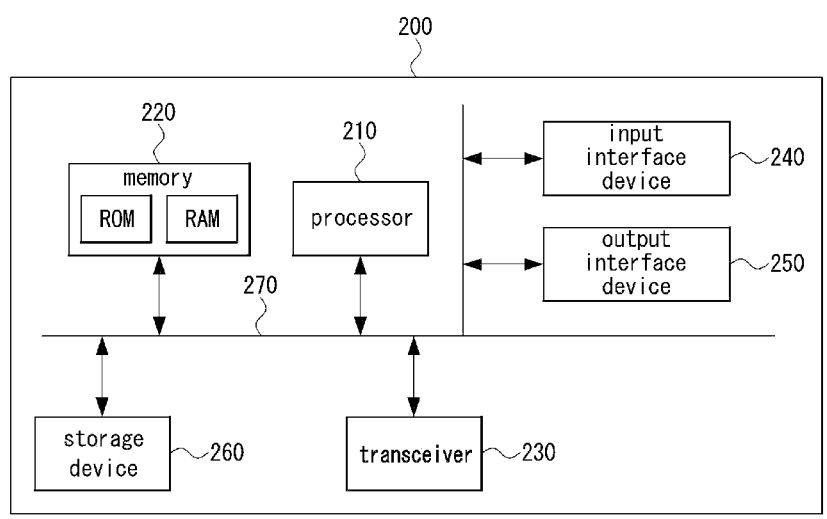
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for configuring and managing radio interfaces in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g., remote radio transmission/reception function, baseband processing function, and the like) of a communication protocol. Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

Hereinafter, sidelink communication will be described. Vehicle-to-Everything (V2X) is a communication technology for exchanging various information including traffic information with other vehicles and other infrastructures such as roads through wired/wireless networks. The V2X includes communication between vehicles (Vehicle-to-Vehicle, V2V), communication between a vehicle and a road infrastructure/network (Vehicle-to-Infrastructure/Network, V2I/N), and communication between a vehicle and a pedestrian (Vehicle-to-Pedestrian, V2P). As an example of V2X communication services, vehicles within a certain range can exchange their own location/speed information and surrounding traffic situation information through V2V communication to prevent sudden traffic accidents, or a platoon driving service can be provided in which a plurality of vehicles connected through V2V communication drive in a convoy on a highway. In addition, by providing high-speed wireless backhaul services to vehicles through V2I/N communication, users in the vehicles can use high-speed Internet services and drive/control the vehicles remotely using V2I/N wireless networks.

In various wireless communication systems including the 3GPP 4G long term evolution (LTE), a device-to-device (D2D) communication scheme, in which terminals can communicate directly with each other without passing through a network node, has been adopted to support the V2X services and various other wireless communication services. In case of 3GPP, a direct communication link between terminal is defined as a sidelink (SL). In case of LTE, communication between terminals is possible through a sidelink even when out of network coverage, and the LTE sidelink communication has been initially standardized for D2D communication purposes in the LTE release-12. Thereafter, there were many standardization efforts in the 3GPP to improve sidelinks suitable for V2X communications.

In various wireless communication systems including the 3GPP 4G long term evolution (LTE), a device-to-device (D2D) communication scheme, in which terminals can communicate directly with each other without passing through a network node, has been adopted to support the V2X services and various other wireless communication services. In case of 3GPP, a direct communication link between terminal is defined as a sidelink (SL). In case of LTE, communication between terminals is possible through a sidelink even when out of network coverage, and the LTE sidelink communication has been initially standardized for D2D communication purposes in the LTE release-12. Thereafter, the 3GPP has additionally designed the LTE sidelink to be suitable for V2X communication and introduced it into the standard.

In June 2018, the 3GPP has completed the 5G NR release-15 standardization and has begone standardizing the NR V2X corresponding to the 3GPP V2X phase 3, at the RAN1 #94 meeting in August 2018. The NR V2X supports improved V2X services in addition to the existing LTE-based V2X services. Rather than replacing the services provided by the LTE V2X, the NR V2X seeks to support improved V2X services by complementing and linking with the LTE V2X. Therefore, the NR V2X should meet higher requirements than the LTE V2X.

The NR V2X release-16 standardization has been conducted primarily with a focus on sidelink design. As described above, a sidelink is a communication link that allows data packets to be exchanged directly between terminals without going through a network. Basically, V2V and V2P links may be sidelinks. In addition, a V2I link between a vehicle and an infrastructure that supports functions of terminals may also correspond to a sidelink. Such the configuration will be described with reference to the accompanying drawings.

Figure 3A:
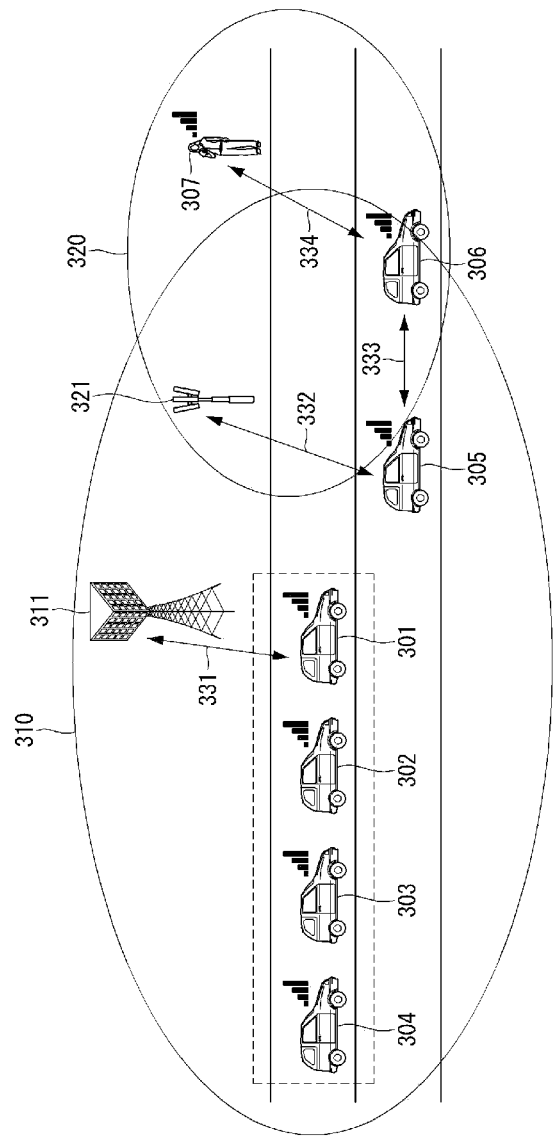
FIG. 3A is a conceptual diagram illustrating types of sidelink communication according to the present disclosure.

FIG. 3A is a conceptual diagram illustrating types of sidelink communication according to the present disclosure.

Referring to FIG. 3A, a base station (BS) 311 may have a base station coverage 310. A plurality of vehicle terminals 301, 302, 303, 304, 305, and 306 may be located within the base station coverage 310. In addition, a road side unit (RSU) 321 may have an RSU coverage 320 based on a sidelink communication scheme. A plurality of terminals 305, 306, and 307 may be located within the RSU coverage 320. FIG. 3A illustrates a user who possesses the terminal 307 capable of sidelink communication with the vehicle terminals 301, 302, 303, 304, 305, and 306 driving on a road. The vehicle terminal may be a terminal mounted on a vehicle (or attached to a vehicle, or carried or worn by a driver or passenger of a vehicle). For convenience of description, these vehicle terminals 301 to 306 will be referred to as vehicles. In addition, for convenience of description, a pedestrian who possess (or carry or wear) the terminal 307 capable of sidelink communication will be referred to as a pedestrian or user. In addition, since FIG. 3A is a diagram for describing sidelink communication according to the present disclosure, only parts related to sidelink communication will be described. Hereinafter, various sidelink communications will be described.

Communication between the base station 311 and the vehicle 301 may be referred to as Vehicle-to-Network (V2N) communication 331. The V2N communication 331 may consist of downlink (DL) from the base station 311 to the vehicle 301 and uplink (UL) from the vehicle 301 to the base station 311. Communication between the RSU 321 and the vehicle 305 may be referred to as Vehicle-to-Infrastructure (V2I) communication 332. The V2I communication 332 may consist of DL, UL, and/or sidelink (SL).

Communication between the vehicle 305 and the vehicle 306 may be referred to as Vehicle-to-Vehicle (V2V) communication 333. The V2V communication 333 is performed in a scheme of performing direct communication between the vehicles, and various data may be transmitted and received between the vehicles without control of a base station or RSU.

Communication between the vehicle 306 and the pedestrian 307 may be referred to as Vehicle-to-Pedestrian (V2P) communication 334. The V2P communication between the vehicle 306 and the pedestrian 307 may refer to communication between a high-speed moving entity and a low-speed moving entity walking. In addition, the V2P communication 334 may include communication between pedestrians or communication between users riding low-speed vehicles such as cars and bicycles.

Figure 3B:
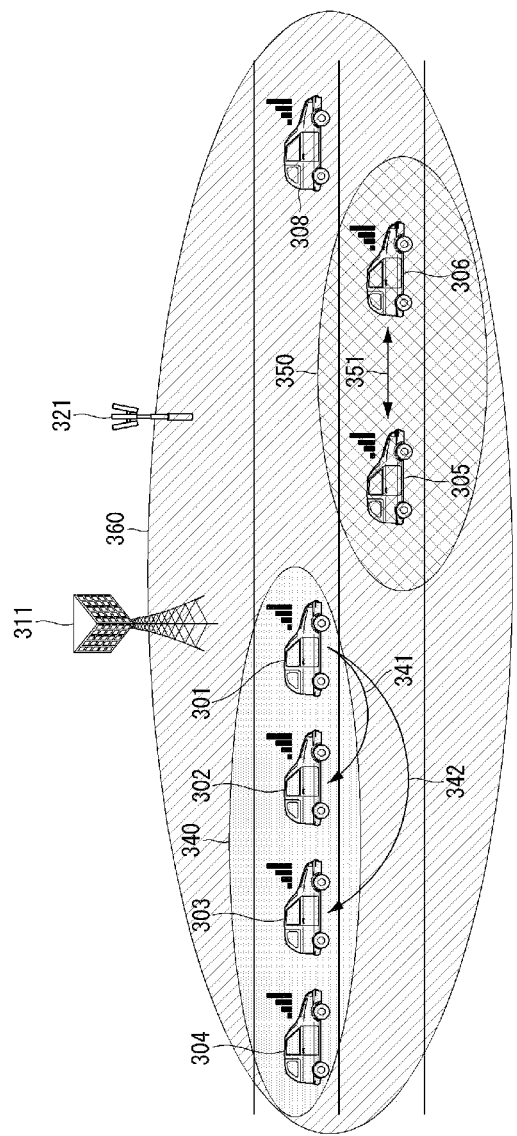
FIG. 3B is a conceptual diagram illustrating broadcast-based, groupcast-based, and unicast-based sidelink communications provided by NR V2X.

FIG. 3B is a conceptual diagram illustrating broadcast-based, groupcast-based, and unicast-based sidelink communications provided by NR V2X.

Comparing FIG. 3B with FIG. 3A, a new vehicle 308 is illustrated instead of the user 307, the coverage of the base station 311 is not illustrated, and the coverage of the RSU 321 is not illustrated. All other components have the same form.

A broadcast communication region 360 for broadcast-based sidelink communication mainly provided by LTE V2X, which is illustrated in FIG. 3B, may be a region where beacon frames are transmitted by a specific communication device. In addition, NR V2X has introduced unicast-based and groupcast-based sidelink communications to support a wider variety of V2X services in addition to the broadcast-based sidelink communication.

Meanwhile, the NR V2X was distributed as a part of the 5G NR release-16 technical specification distributed in January 2020. The NR V2X has introduced unicast-based and groupcast-based sidelink communications to support a wider variety of V2X services in addition to the broadcast-based sidelink communication.

FIG. 3B exemplifies a groupcast communication region 340 of a group to which the vehicles 301, 302, 303, and 304 belong, and a unicast communication region 350 for unicast communication between the vehicle terminals 305 and 306.

A case where the vehicle 301 transmits data (i.e., 341 and 342) to other vehicles 302 and 303 in the groupcast scheme within the groupcast communication region 340 may be considered. In particular, the form illustrated in FIG. 3B may be a form of vehicle platooning. In the case of vehicle platooning, the leading vehicle 301 in a group of vehicles moving together may adjust distances between vehicles by transmitting sidelink messages to the other vehicles 302 and 303. In FIG. 3B, a case where the vehicle 301, which is a terminal within the group, transmits data to the vehicles 302 and 303 within the groupcast communication region 340 is illustrated, but a terminal outside the group may transmit data to the vehicles 301 to 304 within the group through groupcast communication.

In addition, in case of unicast communication, the vehicles 305 and 306 may exist within the unicast communication region 350 and may communicate with each other. Accordingly, in the NR V2X system, messages may be transmitted and received directly between the vehicles 305 and 306, that is, between the terminals, through unicast communication. In other words, the NR V2X system allows terminals to exchange messages directly through unicast communication. In addition, the NR V2X system allows in-group or out-group terminals to deliver messages to terminals formed as a group through groupcast communication.

The main features of the release-16 sidelink technical specifications are as follows.

The NR sidelink uses the same OFDM scheme as UL and DL between a base station and a terminal. In addition, the NR sidelink supports numerologies $\mu \in \{0,1,2,3\}$. One of the differences between SL and DL/UL is that a resource allocation unit is a subchannel rather than a resource block (RB). A subchannel consists of one or more RBs, and the number of subchannels may be preconfigured. A transport block (TB) may be transmitted on a physical sidelink shared channel (PSSCH) that occupies one or more subchannels.

Figure 4B:
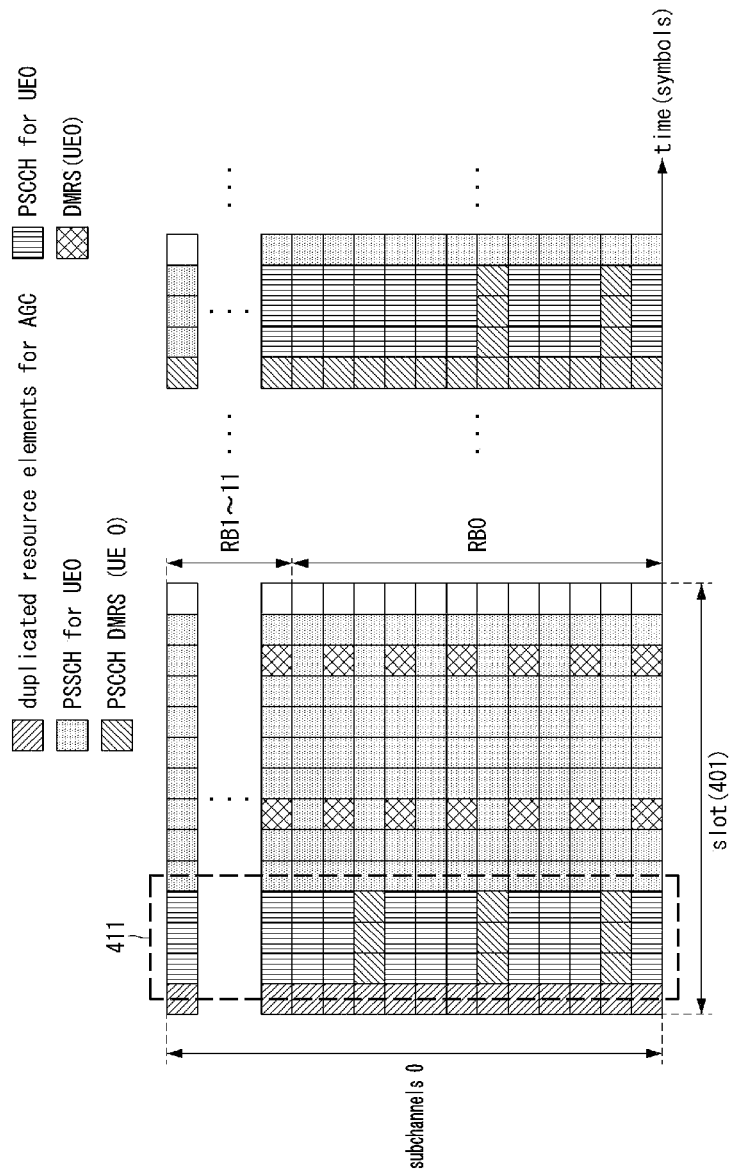
FIG. 4B is a conceptual diagram illustrating a partial configuration of consecutive slots in one sidelink subchannel.
Figure 4C:
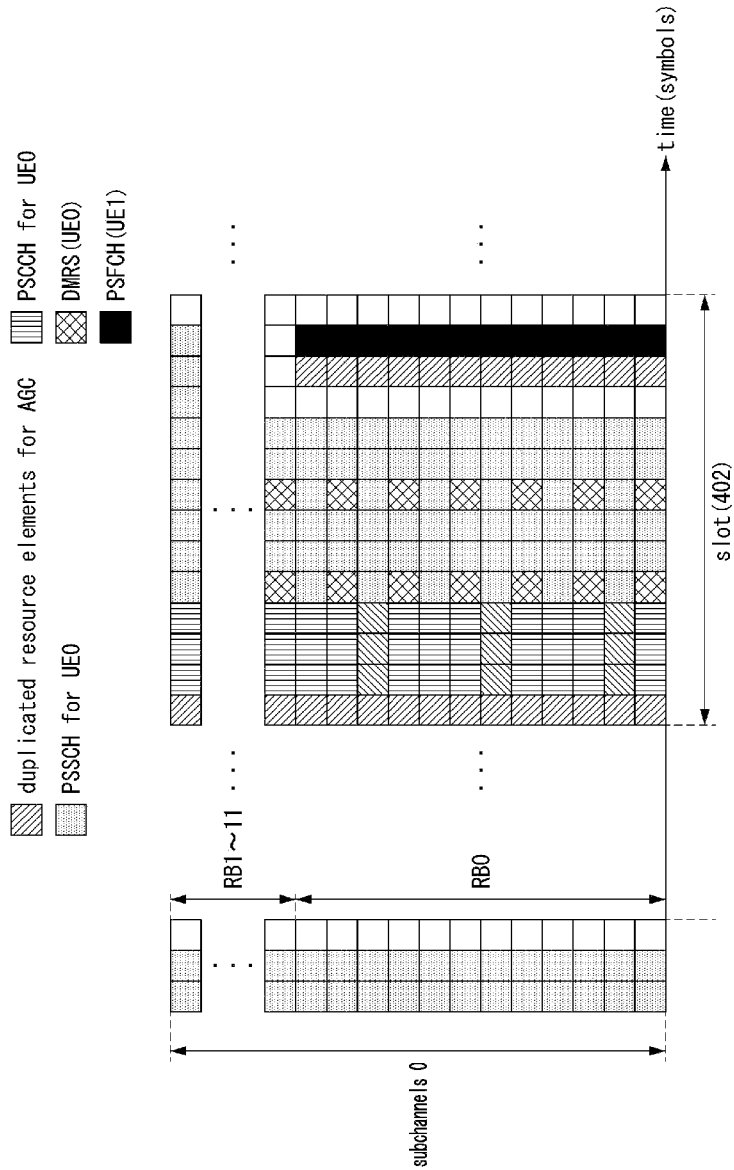
FIG. 4C is a conceptual diagram illustrating the remaining configuration of the consecutive slots in the one sidelink subchannel.

FIG. 4A is a conceptual diagram illustrating a case where 11 subchannels constitute a bandwidth part in sidelink, FIG. 4B is a conceptual diagram illustrating a partial configuration of consecutive slots in one sidelink subchannel, and FIG. 4C is a conceptual diagram illustrating the remaining configuration of the consecutive slots in the one sidelink subchannel.

Referring to FIG. 4A, a case in which up to 11 subchannels are allocated to a sidelink bandwidth part (BWP) for PSSCH transmission is illustrated. More specifically, a case in which a total of 11 subchannels from a subchannel 0 410 to a subchannel 10 420 are used for PSSCH transmission is illustrated. In FIG. 4A, the first symbol may comprise duplicated resource elements for automatic gain control (AGC), and the duplicated resource elements may be obtained by duplicating resource elements of a physical sidelink control channel (PSCCH), a physical sidelink shared channel (PSSCH), and/or a physical sidelink feedback channel (PSFCH).

Referring to FIG. 4B, a configuration example of the subchannel 0 410 is illustrated. A slot 401 may refer to the first slot in the subchannel 0 401 of the sidelink BWP in FIG. 4A. The subchannel 0 410 may be composed of RB0 to RB11, as illustrated in FIG. 4B. In other words, the subchannel 0 410 may be composed of 12 RBs. Therefore, when the sidelink BWP is composed of 11 subchannels as illustrated in FIG. 4A, a total of 132 RBs may be configured as the sidelink BWP.

As illustrated in FIG. 4B, one slot may comprise a PSCCH 411 for UE0 and a PSSCH for UE0, and a demodulation reference signal (DMRS) for UE0 may be included inside the PSSCH. In addition, in the example of FIG. 4B, the PSCCH 411 is allocated to symbols 1, 2, and 3 of the subchannel 0 410.

Meanwhile, in the NR sidelink communication, 2-stage sidelink control information (SCI) may be used. The 2-stage SCI may be composed of first-stage SCI (SCI1) and second-stage SCI (SCI2). The SCI1 may be transmitted on the PSCCH 411 transmitted together with the PSSCH, and the SCI2 may be transmitted on the PSSCH as being multiplexed with a transport block (TB). The main purpose of introducing 2-stage SCI in the NR sidelink communication is to reduce the complexity of SCI decoding for sensing by allowing resource sensing UEs to perform channel sensing by decoding only SCI1.

FIG. 4C illustrates the remaining configuration of the consecutive slots of FIG. 4B described above, and illustrates the last slot 402. A PSFCH carrying HARQ feedback information may be transmitted within the last slot 402 of the sidelink. FIG. 4C illustrates a case where information of UE1 is transmitted through the PSFCH.

Meanwhile, the NR V2X supports a resource allocation mode 2, which is a scheme of communicating only through sidelinks without control of base station(s). In supporting the resource allocation mode 2, the most core technique is a resource sensing and resource selection method for sidelink resources allocated to a terminal. The resource sensing and resource selection method will be described with reference to FIG. 5.

Figure 5:
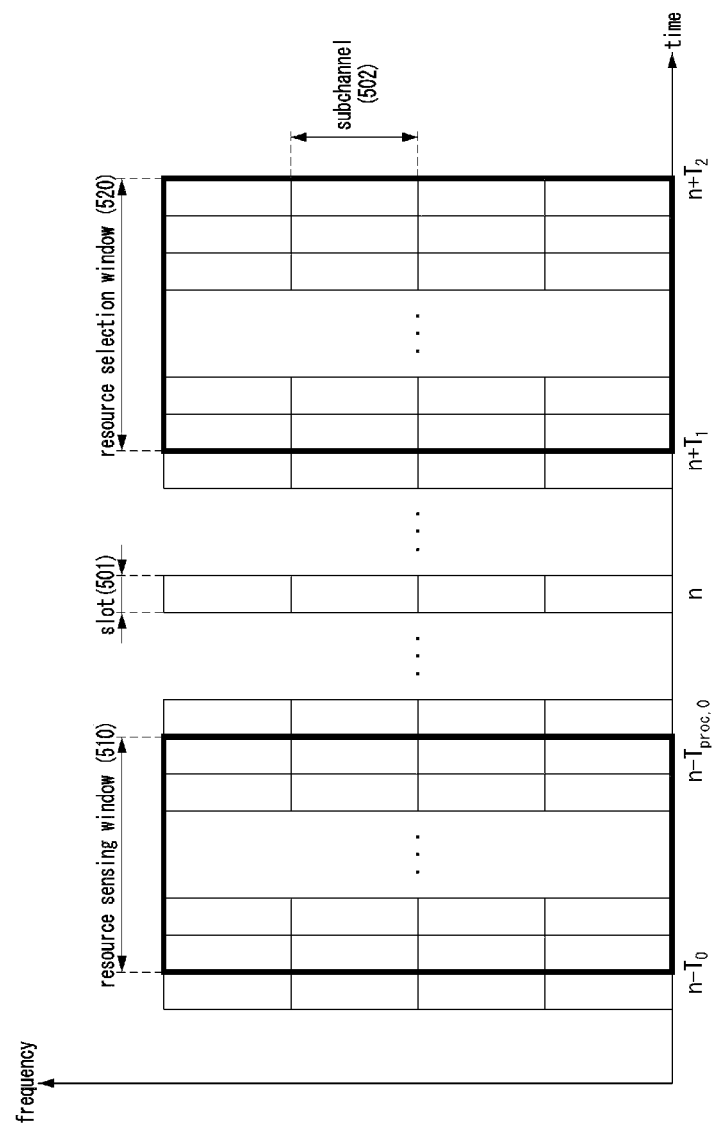
FIG. 5 is an exemplary diagram for describing a resource sensing window and a resource selection window configured in a terminal operating in the resource allocation mode 2 of NR V2X.

FIG. 5 is an exemplary diagram for describing a resource sensing window and a resource selection window configured in a terminal operating in the resource allocation mode 2 of NR V2X.

Referring to FIG. 5, a sidelink resource pool in which transmission and reception is performed may be composed of slot(s) (e.g., 501) in the time domain and subchannel(s) (e.g., 502) in the frequency domain. FIG. 5 illustrates an example in which a terminal operating in the resource allocation mode 2 receives a resource selection trigger in a slot n. When a resource selection operation is triggered in the slot n, the terminal may sense resources in slots of a time period corresponding to a resource sensing window 510. In FIG. 5, a time period of $[n-T_0, n-T_{proc,0}]$ is exemplified as an example of the time period sensed according to the resource sensing window 510. The terminal may select a resource for transmission within a time period corresponding to a resource selection window 520 based on the result of sensing the resources in the resource sensing window 510. In FIG. 5, a time period of $[n+T_1, n+T_2]$ is exemplified as an example of the time period of the resource selection window 520.

Figure 6:
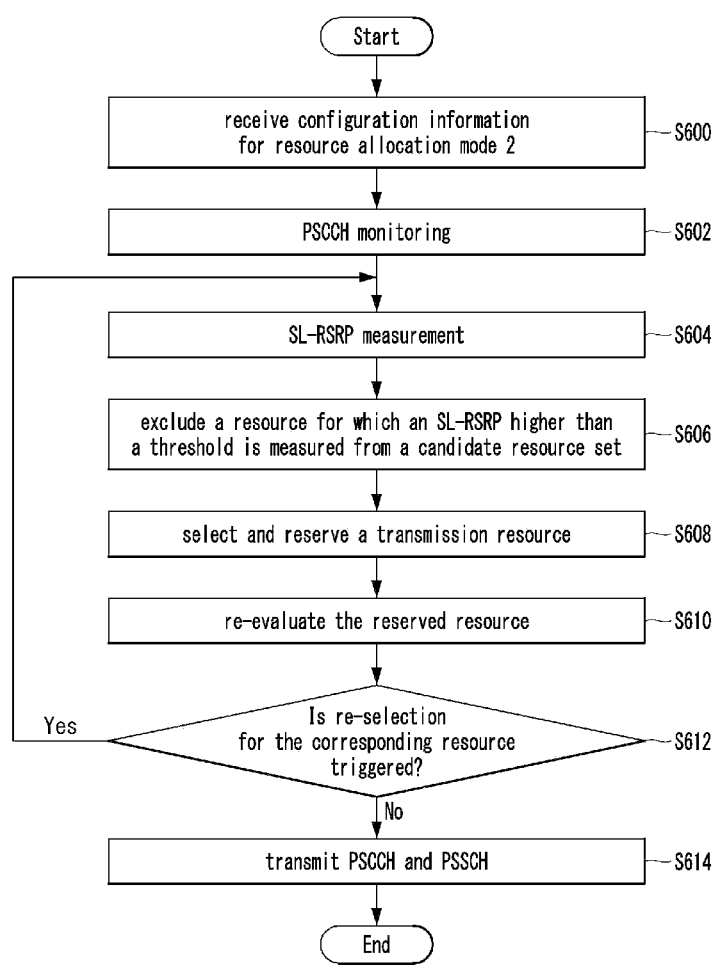
FIG. 6 is a flowchart for sidelink communication in a terminal operating in the sidelink resource allocation mode 2.

FIG. 6 is a flowchart for sidelink communication in a terminal operating in the sidelink resource allocation mode 2.

Referring to FIG. 6, the terminal may receive various configuration information for the resource allocation mode 2 from a higher layer (S600). The configuration information may include various parameters required for resource selection and resource sensing, such as resource pool configuration information, priority information, data packet delay budget (PDB) information, resource reservation interval information, candidate resource set information, resource selection window size information, resource sensing window size information, reference signal received power (RSRP) threshold information, and/or the like.

The terminal may continuously perform monitoring on a physical sidelink control channel (PSCCH) corresponding to a sidelink control channel (S602).

The terminal may measure RSRPs of a demodulation reference signal (DMRS) of the PSCCH detected from the monitoring and a DMRS of a physical sidelink shared channel (PSSCH), which is a sidelink data channel scheduled by the PSCCH (S604).

The terminal may exclude a resource for which an RSRP higher than the threshold received through the configuration information is measured from a preconfigured candidate resource set (S606).

The terminal may select and reserve a resource to be used for transmission from among remaining resources in the candidate resource set except for the excluded resource(s) (S608).

The terminal may re-evaluate the reserved resource (S610).

The terminal may determine whether re-selection for the resource is triggered (S612). As a result of the determination in step S612, if re-selection of the resource to be used for transmission is triggered, the terminal may perform the procedure again from step S604. On the other hand, if it is determined in step S612 that re-selection of the resource to be used for transmission is not triggered, the terminal may transmit a PSCCH and a PSSCH using the resource as it is (S614).

Meanwhile, when the resource selection procedure is triggered in the slot n for the terminal operating in the resource allocation mode 2 in the sidelink-based communication system, the terminal may perform the resource selection procedure according to the following steps. The resource selection procedure described here will be described based on the contents described in the section 8.1.4 of TS 38.214, which is the 3GPP technical specification.

Step 1: Determine a candidate resource set $R_{x,y}$. Here, $R_{x,y}$ may be defined as consecutive $L_{subCH}$ subchannels starting from the $t_y$-th slot in the time domain and the x-th subchannel in the frequency domain within a resource pool configured to the terminal. That is, in the frequency domain, it may comprise subchannels x, x+1, x+2, ..., and x+$L_{subCH}$. The terminal may determine the candidate resource set corresponding to $R_{x,y}$ existing in the resource pool within the time period corresponding to the resource selection window 520, that is, the entire time $[n+T_1, n+T_2]$. In this case, $T_1$ and $T_2$ may be defined as follows.

$T_1$ may be a value that satisfies '$0 \leq T_1 \leq T_{proc,1}$', and may be determined according to an implementation of the terminal. Here, $T_{proc,1}$ may be defined according to a subcarrier spacing as shown in Table 1 below.

TABLE 1

| $\mu_{SL}$ | $T_{proc,1}$ [slots] |
|---|---|
| 0 | 3 |
| 1 | 5 |
| 2 | 9 |
| 3 | 17 |

If a value of $T_2$ min is smaller than a remaining packet delay budget (PDB), a value of $T_2$ may be determined according to an implementation of the terminal as a value satisfying '$T_{2min} \leq T_2 \leq$ remaining PDB'. If the value of $T_{2min}$ is greater than or equal to the remaining PDB, the value of $T_2$ may be determined as the remaining PDB.

The number of candidate resources within the candidate resource set determined through Step 1 described above may be defined as $M_{total}$.

Step 2: Determine the resource sensing window 510. The resource sensing window 410 may be defined as $[n-T_0, n-T_{proc,0}^{SL}]$, where $T_0$ may correspond to a value set by a parameter sl-SensingWindow from the higher layer, and $T_{proc,0}^{SL}$ may be defined according to the subcarrier spacing as shown in Table 2 below.

TABLE 2

| $\mu_{SL}$ | $T_{proc,0}^{SL}$ [slots] |
|---|---|
| 0 | 1 |
| 1 | 1 |
| 2 | 2 |
| 3 | 4 |

The terminal may monitor a PSCCH in the slots corresponding to the resource pool within the resource sensing window 410 as described in steps S602 and S604 of FIG. 6 above, and may measure RSRPs of the PSCCH and a PSSCH corresponding thereto. In this case, a resource used by the terminal for its transmission within the resource sensing window 510 may be excluded from the sensing.

Step 3: The terminal may determine an initial threshold parameter $Th(p_i, p_j)$. The value of $Th(p_i, p_j)$ may be determined as the i-th value configured using a parameter sl-ThresPSSCH-RSRP-List, and in this case, i may be defined as $i = p_i + (p_j - 1) * 8$.

Step 4: The terminal may initialize a resource set $S_A$. In this case, $S_A$ may be initialized with all possible candidate resources $R_{x,y}$.

Step 5: The terminal may exclude candidate resources $R_{x,y}$ satisfying the following conditions from the resource set $S_A$.

Condition 1: Slot $t'^{SL}_m$ which has not been monitored by the terminal in Step 2 Condition 2: When it is assumed that a first Sidelink Control Information (SCI) format (or SCI format 1-A) is received in the slot $t'^{SL}_m$ that the terminal has not monitored, and slots all sub-channels within the resource pool, which correspond to an arbitrary period value indicated by a 'Resource reservation period' field of the first SCI format among period values set by a higher layer parameter sl-ResourceReservePeriodList, are resource-allocated, a case where a condition c of Step 6 to be described below is satisfied Step 6: The terminal may exclude the candidate resources $R_{x,y}$ satisfying the following condition from the resource set $S_A$.

Condition a: The terminal receives the first SCI format in the slot $t'^{SL}_m$, the 'Resource reservation period' field of the first SCI format indicates a value of $P_{rsvp\_RX}$, and a 'Priority' field thereof indicates a $prio_{RX}$.

Condition b: An RSRP value measured for the first SCI format is greater than Th ($prio_{RX}$, $prio_{TX}$).

Condition c: Resources overlapping with the candidate resources $R_{x,y+j \times P'_{rsvp\_TX}}$ (j=0, 1, ..., $C_{resel-1}$) among slots and a set of resource blocks determined by the first SCI format received in the slot $t^{SL}_m$ or the first SCI format that is considered to be received in a slot $t^{SL}_{m+q \times P'_{rsvp\_RX}}$ (q=1, 2, ..., Q) according to the period value indicated by the 'Resource reservation period' field. Here, Q is defined as $$Q = \left\lceil \frac{T_{scal}}{P_{rsvp\_RX}} \right\rceil,$$

and $T_{scal}$ corresponds to a value obtained by converting the length of the resource selection window 520, $T_2$, in milliseconds (msec).

Step 7: If the number of remaining candidate resources in the resource set $S_A$ is less than $X \cdot M_{total}$, the terminal may increase the value of Th($p_i,p_j$) by 3 dB, and may perform the procedure again from Step 4.

The terminal may report the resource set $S_A$ determined through the above procedure to the higher layer.

If a resource $r_i$ in ($r_0, r_1, r_2, ...$), which is a target resource for re-evaluation, is not included the resource set $S_A$, the terminal may report re-evaluation of the corresponding resource $r_i$ to the higher layer.

If a resource $r'_i$ in ($r'_0, r'_1, r'_2, ...$), which is a target resource for pre-emption, is excluded according to Step 6 above, is not included in the resource set $S_A$, and satisfies at least one of the following conditions, the terminal may report pre-emption of the resource $r'_i$ to the higher layer.

Condition 1: A parameter sl-PreemptionEnable is set to 'enable' and '$prio_{TX} > prio_{RX}$' is satisfied Condition 2: When the parameter sl-PreemptionEnable is set but not set to 'enable', and both '$prio_R X < prio_{pre}$' and '$prio_{TX} > prio_{RX}$' are satisfied Hereinafter, 5G NR sidelink communication in an unlicensed band will be described.

The NR-Unlicensed (NR-U) is an operating mode introduced in release 16 (Rel-16) to support 5G NR networks operating in unlicensed bands. The NR-U enables UL and DL communications in unlicensed bands by supporting a variety of new functions. UL and DL communications in a frame structure type 3 newly introduced in the 5G NR-U use separate time resources within the same frequency band, similarly to the LTE time division duplex (TDD) scheme.

In addition, for DL and UL communications in NR-U, resources are allocated through a channel access scheme based on Listen-Before-Talk (LBT). A terminal and a base station should check whether there is no ongoing communication in a communication channel before transmitting a signal by sensing the communication channel through an LBT technique.

According to the current Rel-16 NR-U specifications, a unit of resources on which channel sensing is performed is an RB set. When an energy level measured for each RB set is less than an energy detection (ED) threshold, the terminal may determine the corresponding RB set to be idle. The terminal may use the RB set determined to be idle for resource allocation. Here, according to the 3GPP TR 38.889, the ED threshold for the NR-U LBT may be −72 dBm.

The size of RB set may correspond to 100 to 110 RBs in case of 15 kHz subcarrier spacing (SCS) and 56 RBs in case of 30 kHz SCS. In case of 30 kHz SCS, RB sets may each have 50 to 55 RBs, excluding at most one RB set. A guard band may exist between two adjacent RB sets. When the terminal uses two adjacent RB sets, the terminal may transmit a UL channel/signal in resources belonging to the guard band for consecutive UL resource allocation in the frequency domain. The LBT schemes supported by NR-U may be classified into types as follows.

(1) LBT Type 1 (LBT category: CAT4-LBT): The LBT procedure may be performed according to a protocol having the same processes as CSMA/CA. That is, the LBT procedure may be performed based on additional sensing slots, random back off, and variable contention window size.

(2) LBT Type 2A (LBT category: CAT2-LBT): If a channel is determined to be idle by performing channel sensing for 25 s, resources are allocated to the channel.

(3) LBT Type 2B (LBT category: CAT2-LBT): If a channel is determined to be idle by performing channel sensing for 16 s, resources are allocated to the channel.

(4) LBT Type 2C (LBT category: CAT1-LBT): Resources may be allocated to a channel immediately without performing an LBT procedure. However, a channel occupancy time (COT) may be configured up to 584 s.

Figure 7:
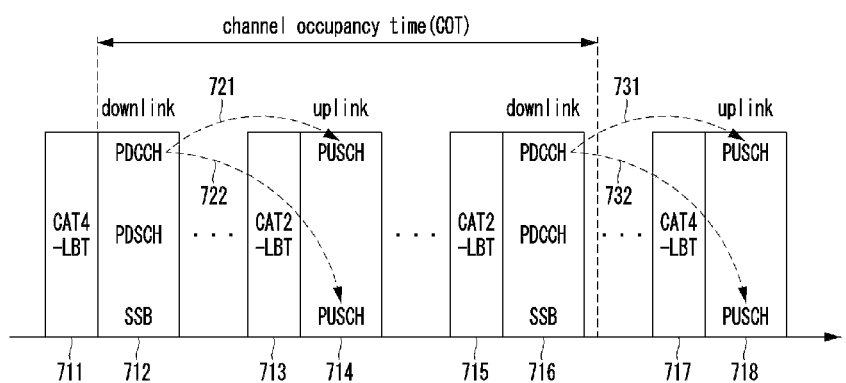
FIG. 7 is a conceptual diagram illustrating LBT-based downlink and uplink communications.

FIG. 7 is a conceptual diagram illustrating LBT-based downlink and uplink communications.

Referring to FIG. 7, a reference numeral 711 illustrates an operation in which a ULE senses resources based on LBT Type 1, that is, CAT4-LBT. If a resource sensed based on the CAT4-LBT scheme 711 is determined to be idle, the AP and UE may transmit and receive control information and/or data in downlink 712. The control information may be transmitted on a physical downlink control channel (PDCCH), and the data may be transmitted on a physical downlink shared channel (PDSCH). In addition, synchronization signal blocks (SSBs) may be transmitted in the downlink 712.

Meanwhile, the PDCCHs may indicate uplink resource allocations 721, 722, 731, and 732. Uplink data may be transmitted on physical uplink shared channels (PUSCHs) in the uplink (i.e., 714 and 718) according to the indicated uplink resource allocations.

In the example of FIG. 7, a case in which the downlink communication (i.e., 712 and 716) and the uplink communication (i.e., 714 and 718) are alternately performed within a COT is illustrated. Further, CAT4-LBT procedures 711 and 717 may be performed before the COT, and CAT2-LBT procedures 713 and 715 may be performed within the COT.

In the above, the sidelink communication based on Rel-16 among the 3GPP specifications has been described. Rel-18 sidelink standardization has begun as a Rel-18 sidelink work item (i.e., WI 'NR sidelink evolution') from the RAN1 #109-e meeting in May 2022. In the Rel-18 sidelink WI, standardization works are in progress to support sidelinks operating in unlicensed bands, and include two standardization items below.

First, unlicensed band sidelink channel access mechanism (design baseline: NR-U channel access mechanism).

Second, design of unlicensed band sidelink physical channels.

Hereinafter, methods and apparatuses for providing sidelink communication based on the standardization items for unlicensed band sidelinks illustrated above will be described. In other words, the present disclosure described below will describe unlicensed band sidelink (hereinafter referred to as 'SL-U') communication methods and apparatuses. In describing the present disclosure described below, 'configuration' may include both configuration or pre-configuration.

Feature 1 of the present disclosure: SL-U frequency domain resource allocation method (consecutive RB-based allocation method)

FIG. 8A is a conceptual diagram illustrating a method of allocating resources in the frequency domain in a sidelink unlicensed band.

Referring to FIG. 8A, a horizontal axis may indicate frequency and exemplify an RB set 0 810, RB set 1 820, and RB set 2 830. In addition, guard bands (GBs) 815 and 825 may be respectively located between the RB sets. In this regard, at the RAN1 #110 meeting in August 2022, it was agreed to consider both a consecutive RB-based transmission scheme and an interlaced RB-based transmission scheme for SL-U PSCCH and PSSCH transmissions. In an unlicensed band, a resource allocation unit of UL/DL may be an RB. On the other hand, in case of SL-U, a resource allocation unit may be a subchannel. That is, the resource allocation unit for UL/DL in an unlicensed band and the resource allocation unit for SL-U are different from each other. Since the resource allocation unit for SL-U is a subchannel, unlike the resource allocation unit for UL/DL in an unlicensed band, the following problems may occur.

The example of FIG. 8A illustrates a case where resources 811 of subchannels 0 to 2 are allocated to a UE 0, and resources 831 of subchannels 9 and 10 are allocated to a UE1. As illustrated in FIG. 8A, the size of one subchannel may correspond to 10, 12, 15, 20, 25, 50, 75, or 100 physical resource blocks (PRBs). Since one subchannel consists of a plurality of RBs, there is a high possibility that the subchannels are not accurately aligned with RB sets available in the unlicensed band, as illustrated in FIG. 8A. In other words, the RB set 0 810 and the resources 811 allocated to the UE 0 may not match.

More specifically, the RB set 0 810 may include frequency resources up to a middle part of a subchannel 3. When a case occurs in which resources of a subchannel of SL-U and resources of an RB set do not match as described above, that is, when a subchannel, which is the resource allocation unit for SL-U, and an RB unit specified in the 3GPP specification are not accurately aligned, a subchannel that is not completely included in an RB set may occur. Specifically, the subchannel 3, only a portion of which is included in the RB set, cannot be used for PSCCH/PSSCH transmission. Accordingly, in case of SL-U, where resources are allocated on a subchannel basis, resource waste may occur due to the difference between the resource allocation units according to the specifications.

The present disclosure proposes methods for preventing such waste of resources and improving resource efficiency as follows.

1. In the present disclosure, a PSCCH is allocated starting from a PRB 0 of a subchannel with the lowest subchannel index among subchannels completely belonging to an RB set.
2. After allocating resources of the PSCCH, a transmitting UE may allocate, for PSSCH transmission, subchannels from the subchannel to which the PSCCH is allocated to a subchannel with the highest index among the subchannels completely belonging to the RB set to which the PSCCH belongs.
3. In case of a subchannel spanning a guard band, the transmitting ULE may or may not utilize only PRBs of the subchannel, which are included within the RB set. This will be described with reference to the accompanying drawing.

Figure 8B:
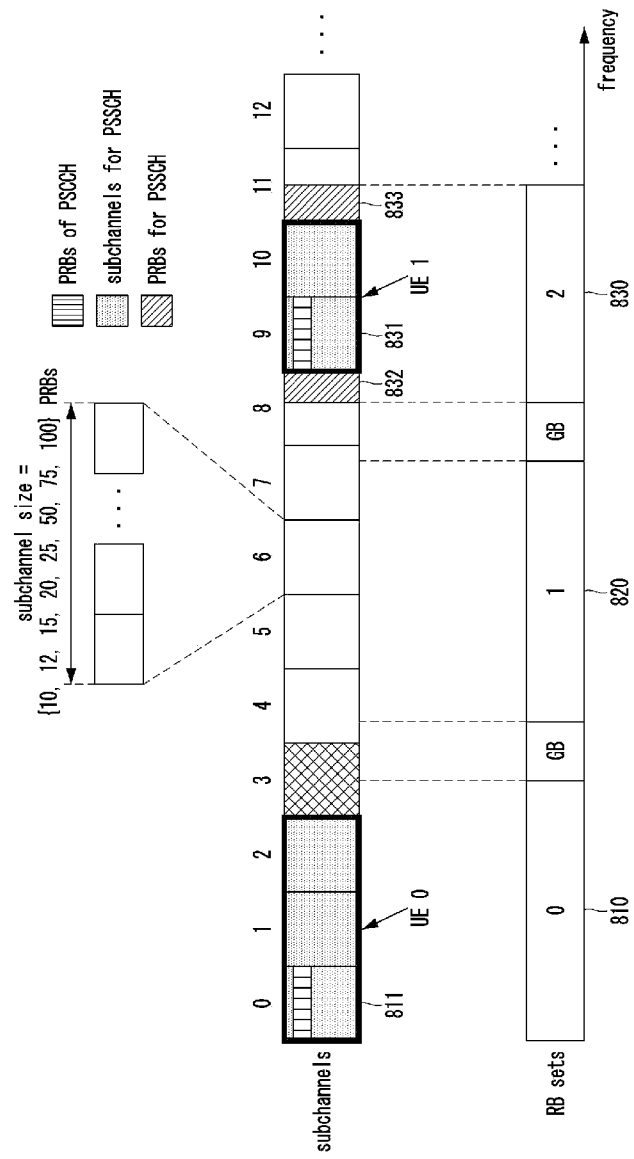
FIG. 8B is a conceptual diagram illustrating a method for allocating resources in the frequency domain in a sidelink unlicensed band according to the present disclosure.

FIG. 8B is a conceptual diagram illustrating a method for allocating resources in the frequency domain in a sidelink unlicensed band according to the present disclosure.

Referring to FIG. 8B, a case in which frequency resources are allocated only to the resources 811 of the subchannels completely included in the RB set 0 810, as previously illustrated in FIG. 8A. On the other hand, the resources 831 of the subchannels completely included in the RB set 2 830 may be allocated to the UE1. In addition, the UE 1 may be allocated with some frequency resources 832 of the subchannel 8, which is partially overlapped with the RB set 2 830, and some frequency resources 833 of the subchannel 9, which is partially overlapped with the RB set 2 830.

The overlapped frequency resources 832 and 832 will be referred to as orphan PRBs in the following description. In order to use the orphan PRBs 832 and 833, the UE 1 may need to identify that the subchannels 8 and 11 are not reserved by other UEs through sidelink resource sensing. When the UE 1 identifies that other UEs do not reserve the subchannels 8 and 11, the UE 1 may allocate the orphan PRBs 832 of the subchannel 8 which overlap with the RB set 2 830 and the orphan PRBs 833 of the subchannel 11 which overlap with the RB set 2 830 to PSSCH transmission. When the transmitting UE allocates the orphan PRBs 832 and 833 to PSCCH/PSSCH transmission as described above, the transmitting UE may need to inform, to receiving UE(s) and sensing UE(s) and through SCI (i.e., SCI1 or SCI2) or MAC CE, that the orphan PRBs have been allocated.

4. In addition, the transmitting UE may or may not consider the orphan PRBs 832 and 833 in calculating a TB size (TBS). This needs to be notified to the receiving UE through SCI (SCI1 or SCI2) or MAC CE. Methods of utilizing the orphan PRBs 832 and 833 will be described as follows.

A. For example, the UE 1 in FIG. 8B may consider the number of orphan PRBs 832 and 833 allocated in the subchannels 8 and 11 when calculating a TBS, but may not consider it when calculating the TBS. When the orphan PRBs 832 and 833 are not considered in the TBS calculation, an effective code rate may be lowered, thereby improving link performance. On the other hand, when the orphan PRBs 832 and 833 are considered in the TBS calculation, there is an advantage in being able to transmit a larger TB.

B. Also, when orphan PRBs (e.g., 832 and 833) of two or more subchannels are utilizable, as in the UE 1 of FIG. 8B, whether to utilize the orphan PRBs may be determined for each subchannel having the orphan PRB(s). Therefore, whether each of the orphan PRBs 832 and 833 is allocated may be notified to the receiving UE(s) and sensing UE(s) through SCI (SCI1 or SCI2) or MAC CE for each subchannel. In case of the UE 1 in FIG. 8B, 2-bit information may be used to notify whether each of the orphan PRBs 832 and 833 is allocated to the receiving UE(s) and sensing UE(s).

C. A DMRS allocation pattern of a PSSCH in the orphan PRBs 832 and 833 may be the same as that for a DMRS allocated to PRBs to which no PSCCH is allocated. For example, the DMRS in the orphan PRBs 832 and 833 of the subchannels 8 and 11 may have the same pattern as a DMRS allocated to PRBs in the subchannel 10.

Feature 2 of the present disclosure: Utilization of PRBs within a guard band between adjacent RB Sets Hereinafter, methods of utilizing PRBs within a guard band between adjacent RB sets, according to the present disclosure, will be described.

In NR-U, when all LBT procedures performed by a UE on two RB sets on both sides of a guard band succeed, and these two RB sets are used for transmission at the same time, PRB resources belonging to the guard band can be allocated. When LBT procedure(s) for at least one RB set among the LBT procedures performed by the UE on the RB sets on both sides of the guard band fails, PRB resources belonging to the guard band cannot be used. This will be described with reference to the accompanying drawing.

Figure 9A:
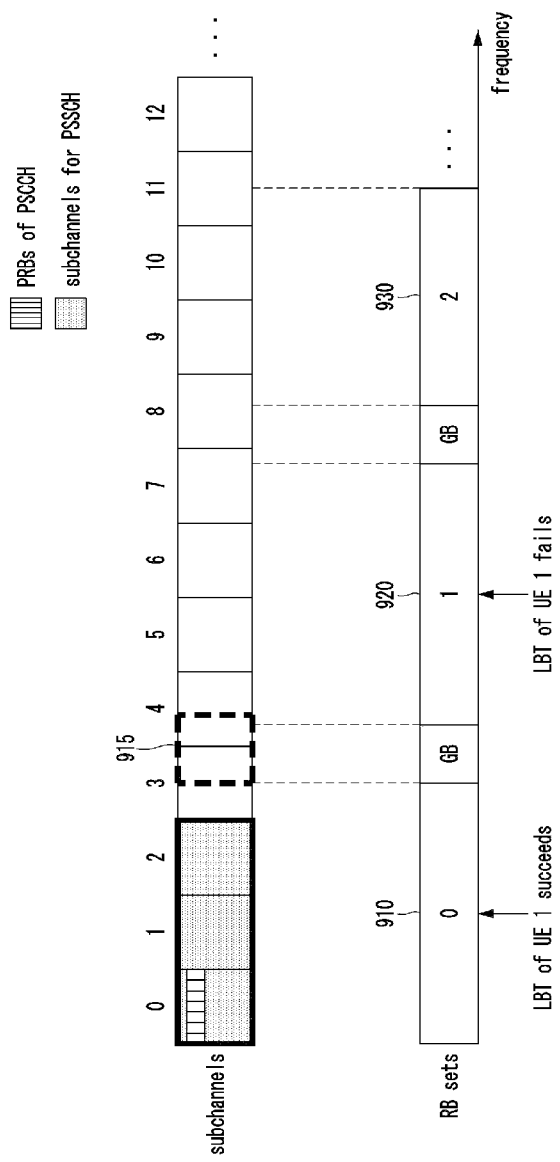
FIG. 9A is a conceptual diagram illustrating a case in which resources of a guard band are not utilized when a UE fails at least one LBT procedure on RB sets on both sides of the guard band.

FIG. 9A is a conceptual diagram illustrating a case in which resources of a guard band are not utilized when a UE fails at least one LBT procedure on RB sets on both sides of the guard band.

Referring to FIG. 9A, a UE 0 is illustrated as corresponding to a case where the NR-U scheme is applied to SL-U communication. As illustrated in FIG. 9A, if an LBT procedure performed by the UE 0 for an RB set 0 910 succeeds, but an LBT procedure for an RB set 1 920 fails, PRBs belonging to a guard band between the two RB sets cannot be used for PSCCH/PSSCH transmission. Accordingly, the UE 0 may utilize only subchannel 0, 1, and 2 included in the RB set 0 910 on which the LBT procedure succeeded for PSCCH/PSSCH transmission.

In addition, since a resource allocation unit for SL is a subchannel, if Feature 1 described above is not applied, a problem of wasting the entire subchannels 3 and 4 spanning the guard band may occur. Accordingly, the present disclosure may use methods described below to solve the above-described problem.

Figure 9B:
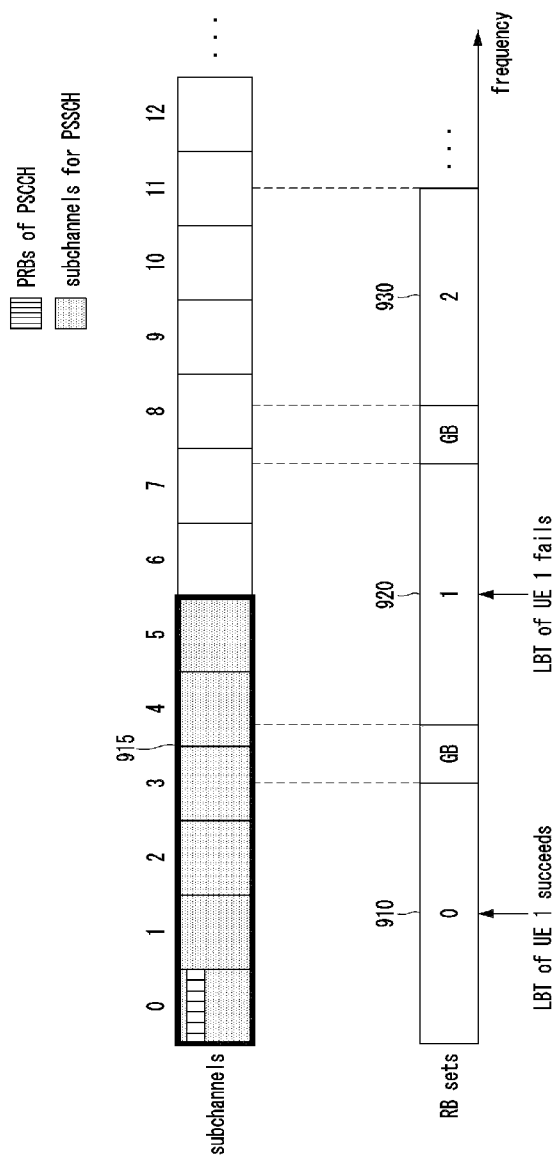
FIG. 9B is a conceptual diagram illustrating a case in which resources of a guard band are utilized when a UE succeeds both LBT procedures on RB sets on both sides of the guard band.

FIG. 9B is a conceptual diagram illustrating a case in which resources of a guard band are utilized when a UE succeeds both LBT procedures on RB sets on both sides of the guard band.

Referring to FIG. 9B, the UE 0 is illustrated as corresponding to a case where the NR-U scheme is applied to SL-U communication. As illustrated in FIG. 9B, the LBT procedure performed by the UE 0 on the RB set 0 910 succeeds, and the LBT procedure performed by the UE 0 on the RB set 1 920 also succeeds. In this case, PRBs belonging to the guard band between the two RB sets 910 and 920 may be used for PSCCH/PSSCH transmission. Therefore, the UE 0 may utilize not only the subchannels 0, 1, and 2 included in the RB set 0 910 on which the LBT procedure succeeded, but also the entire subchannels 3 and 4 spanning the guard band, for PSCCH/PSSCH transmission. In addition, since the UE 0 also succeeded in the LBT procedure on the RB set 1 920, the subchannels 5 and 6 may also be used for PSCCH/PSSCH transmission. However, the example of FIG. 9B illustrates a case where only the subchannels 0 to 5 are used for PSCCH/PSSCH transmission.

When the UE 0 succeeds in the LBT procedures on the two RB sets 910 and 920, the UE 0 may use the subchannel 0 through up to the subchannel 6. In addition, when applying Feature 1 of the present disclosure described above, even orphan PRBs of the subchannel 7 may be additionally allocated to PSCCH/PSSCH transmission. The current trend of SL-U standardization is also toward not using PRBs within a guard band except when LBT procedures on two adjacent RB sets are successful.

Due to the characteristics of the SL-U communication scheme, even when an LBT procedure performed by a transmitting UE on a specific RB set succeeds, not all subchannels belonging to the specific RB set may be utilizable. As a result of the SL resource sensing of the transmitting UE described above, if some subchannels in the corresponding RB set are reserved by another UE, the transmitting UE may need to perform subchannel allocation by avoiding them. A case where resources reserved by another UE exist as described above will be described with reference to the accompanying drawing.

Figure 10:
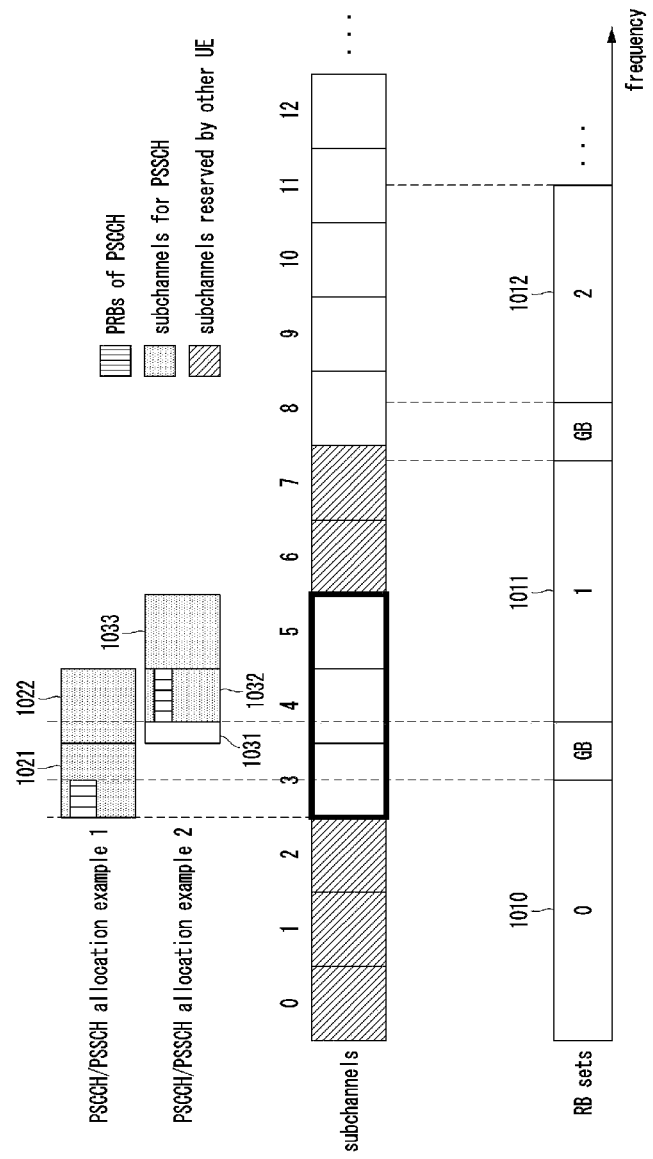
FIG. 10 is a conceptual diagram illustrating a case of allocating resources by avoiding resources reserved by other UEs and according to SL resource sensing results.

FIG. 10 is a conceptual diagram illustrating a case of allocating resources by avoiding resources reserved by other UEs and according to SL resource sensing results.

FIG. 10 illustrates RB sets 1010, 1011, and 1012, and illustrates a case where guard bands are arranged between the RB sets. In addition, subchannels 0 to 12 are illustrated. FIG. 10 exemplifies 'PSCCH/PSSCH allocation example 1' and 'PSCCH/PSSCH allocation example 2'.

First, 'PSCCH/PSSCH allocation example 2' will be described. Although a UE succeeds in an LBT procedure on the RB set 1 1011, as a result of performing SL resource sensing, a case where the remaining subchannels except for subchannels 4 and 5 are unusable because they are reserved by neighboring UE(s) may occur. In this case, since some PRBs of the subchannel 4 overlap with the guard band, the UE may not be able to allocate a PSCCH/PSSCH to orphan PRBs 1031 that overlap with the guard band. Accordingly, a PSCCH/PSSCH may be allocated in the subchannel 5 1033 and the remaining PRBs 1032 of the subchannel 4.

In addition, 'PSCCH/PSSCH allocation example 1' may correspond to a case where the UE succeeds in the LBT procedures on the RB set 0 1010 and the RB set 1 1011 and thus the UE is able to utilize the guard band. When the LBT procedures on the RB set 0 1010 and the RB set 1 1011 are successful, the UE may allocate all of the subchannels 3 and 4, which have PRBs overlapping with the guard band, to PSCCH/PSSCH transmission. However, as illustrated in FIG. 10, a PSCCH may not use PRB(s) belong to the guard band. This takes into account various types of sensing UE. A case where the sensing UE can use PRB(s) within the guard band and a case where the sensing UE cannot use PRB(s) within the guard band may be considered separately. In case of the sensing UE that cannot use PRBs within the guard band, complexity may increase when performing blind decoding on a PSCCH (SCI1) because the number of PSCCH-occupied PRBs varies. Therefore, it is advantageous in terms of UE complexity to allocate the PSCCH to PRB(s) other than the PRB(s) within the guard band. Accordingly, the present disclosure illustrates the case where a PSCCH is allocated to PRB(s) excluding PRB(s) within the guard band. However, it should be noted that the PSCCH is not limited to being allocated only to PRB(s) excluding PRB(s) within the guard band, and a merely preferable form is described in the present disclosure.

In relation to the contents described above, the preferred methods proposed in the present disclosure may be summarized as follows.

1. The transmitting UE may allocate a PSCCH excluding PRB(s) within a guard band.
2. A PSSCH may be allocated when LBT procedures on two adjacent RB sets succeed and a subchannel spanning a guard band therebetween is not reserved by another UE.
3. If the number of PRBs that do not overlap with the guard band within the subchannel spanning the guard band is insufficient to accommodate the PSCCH to be transmitted, additional symbols may be assigned in the time domain. The PSCCH of 'PSCCH/PSSCH allocation example 1' in FIG. 10 may be a corresponding example. In this case, an increase in the complexity of blind decoding may be prevented by designing such that a sensing terminal can also know whether additional symbols are used.

An exemplary embodiment that allows the sensing terminal to know whether additional symbols are used will be described. Due to the inability to utilize PRBs within the guard band, the number of PRBs that can actually be allocated to PSCCH transmission may be exemplified as shown in Equation 1 below.

$$\alpha_n \cdot N_{PSCCH-PRB} \quad \text{[Equation 1]}$$

In Equation 1, $N_{PSCCH-PRB}$ denotes a preset number of PSCCH PRBs, and $\alpha_n$ may be defined as $0 \leq \alpha_n \leq 1$ (n=1, 2, ..., $N_{add\_symb}$). In addition, an and the maximum number $N_{add\_symb}$ of symbols that can be added to PSCCH transmission within a slot are preset values.

Feature 3 of the present disclosure: SL-U time domain resource allocation method Hereinafter, SL-U time domain resource allocation methods according to the present disclosure will be described.

At the RAN1 #109-e meeting, it was agreed to support the existing Rel-16/17 NR SL slot-based PSCCH/PSSCH transmission for NR SL-U. In addition, discussions are underway on whether to support additional starting symbol positions within a slot for PSCCH and PSSCH transmission.

Figure 11:
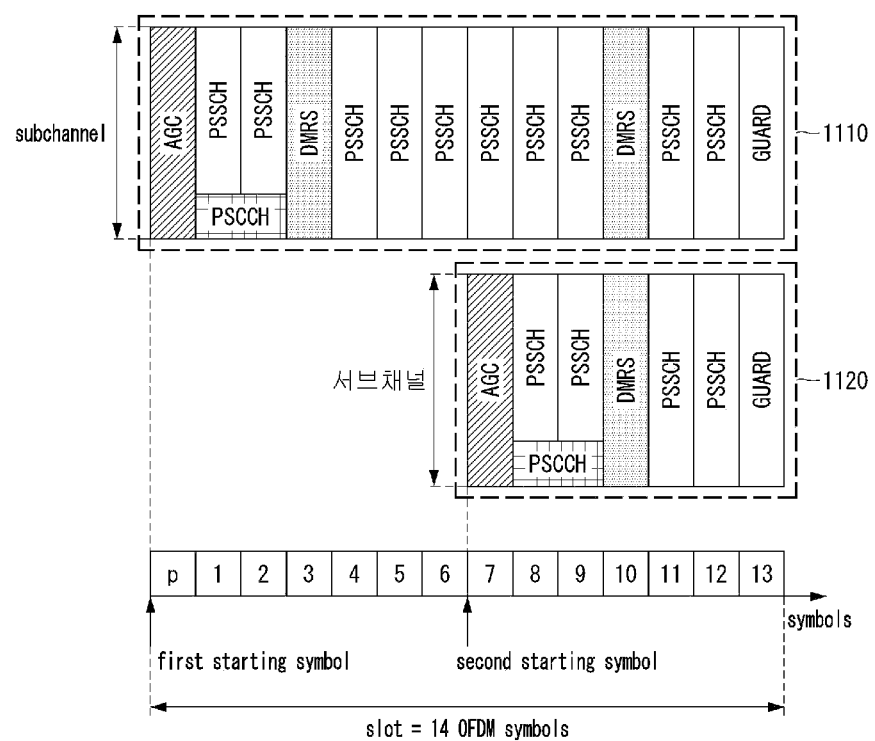
FIG. 11 is a conceptual diagram illustrating starting symbol positions in the SL-U time domain.

FIG. 11 is a conceptual diagram illustrating starting symbol positions in the SL-U time domain.

Referring to a lower part of FIG. 11, a case in which 14 OFDM symbols constitute one slot is illustrated. In general, in SL-U communication, an ACG symbol may be transmitted as a symbol 0, as shown by reference numeral 1110. In addition, a PSCCH may be transmitted in a part of symbols 1 and 2, and a PSSCH may be transmitted in the remaining part of the symbols 1 and 2. A DMRS may be transmitted in symbols 3 and 10, and a PSSCH may be transmitted in symbols 4 to 9, and symbols 11 and 12. A symbol 13 may correspond to a guard time. In other words, all symbols within the slot may be transmitted as symbols for SL-U communication.

In the present disclosure, a time at which symbols for SL-U communication are transmitted may be determined to start from a position corresponding to (½) of the slot, as indicated by reference numeral 1120. The time corresponding to (½) of the slot shown in FIG. 11 is merely an example, and is not limited thereto. The advantage of introducing additional starting symbol(s), as shown by reference numeral 1120 in FIG. 11, is that a COT loss may be reduced by increasing an opportunity for an SL-U UE to access an unlicensed band channels with a higher probability.

Accordingly, it is necessary to design related SL-U physical channels and define related procedures to introduce additional starting symbols. The disclosure proposes the following method.

1. A sidelink transmitting terminal may be configured with a plurality of starting symbols that can be used for PSCCH and PSSCH transmission.
2. A sidelink transmitting terminal may perform PSCCH/PSSCH transmission using a position of a starting symbol other than a default starting symbol (e.g., in case of reference numeral 1110). In the following description, for convenience of description, the case where SL-U symbols are transmitted from the symbol 0, as shown by reference numeral 1110, will be referred to as the 'default starting symbol' or 'first starting symbol'. Therefore, when performing PSCCH/PSSCH transmission using a starting symbol (e.g., second starting symbol) other than the first starting symbol, as shown by reference numeral 1120, the PSCCH/PSSCH transmission may be extended to the next slot. The present disclosure proposes PSCCH/PSSCH and DMRS resource allocation schemes for the case where the PSCCH/PSSCH transmission is extended to the next slot. This will be described in detail as follows.

[A. Allocation Scheme 1]
  i. A scheme for allocating resources within the first slot may be (pre-)configured for each position of the additional starting symbol.
  ii. A scheme of allocating PSCCH/PSSCH and DMRS resources within the second slot may be indicated by SCI in the first slot.

[B. Allocation Scheme 2]
  i. Allocation for each of the first and second slots may basically start from a starting symbol of each slot as indicated by SCI in the first slot. In this case, a time resource indicator value (TRIV) in the existing SL may be required to be updated. This will be described with reference to the accompanying drawing.

Figure 12:
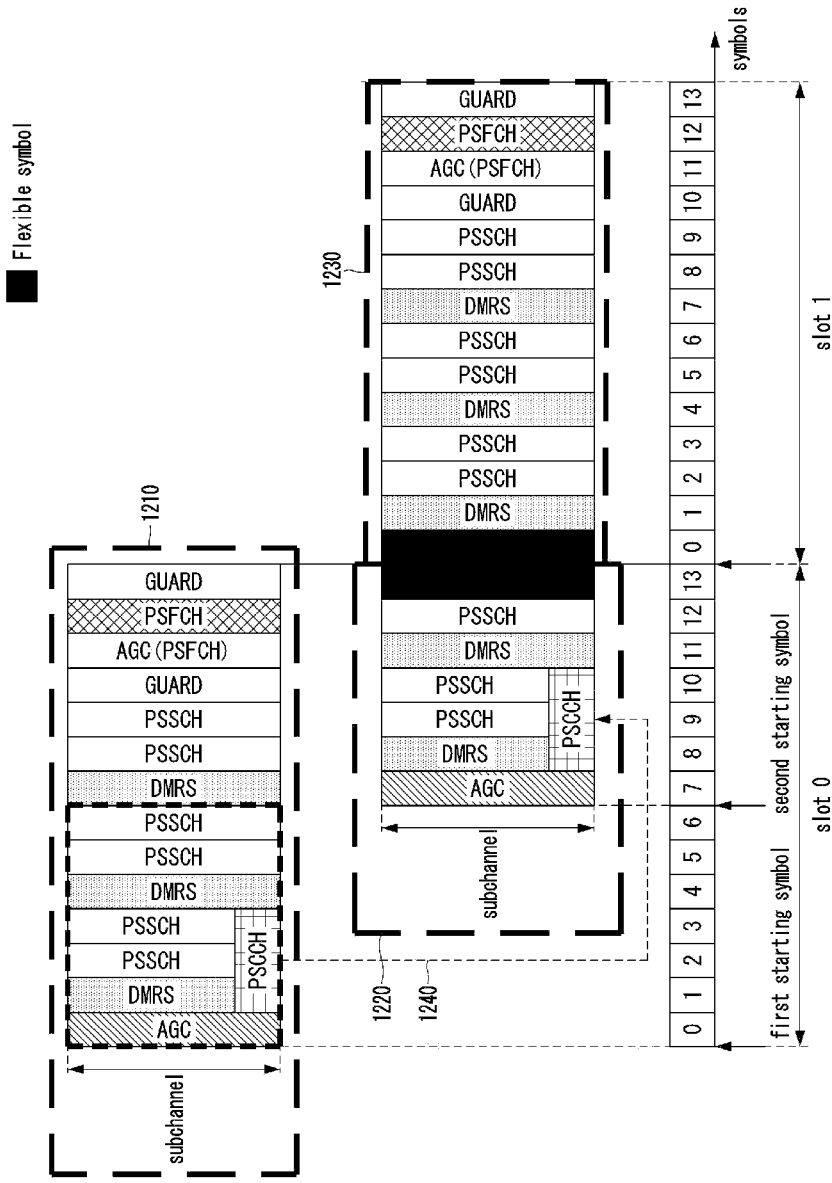
FIG. 12 is a conceptual diagram illustrating an example of extending a transmission slot according to an additional starting symbol in NR SL-U.

FIG. 12 is a conceptual diagram illustrating an example of extending a transmission slot according to an additional starting symbol in NR SL-U.

Referring to an upper part of FIG. 12, a case in which a subchannel 1210 starts from a symbol 0 of a slot 0, but transmission cannot be performed due to a failure of an LBT procedure is illustrated. When the LBT procedure fails, a UE needs to wait until the next slot to transmit. In this case, a loss of a COT may occur due to waiting for transmission until the next slot.

It has been described that a transmitting terminal according to the present disclosure can determine multiple starting symbol positions within a slot. In the exemplary embodiment of FIG. 12, even when an LBT procedure fails during a period from the default starting symbol (or, first starting symbol) to a certain symbol, if data transmission becomes possible at the second or third starting symbol, transmission may be performed from a certain symbol within the slot. The exemplary embodiment of FIG. 12 illustrates a case where the second starting symbol corresponds to a symbol 7, which is the eighth symbol. This is merely one example, and the position of the second starting symbol (and/or the position of the third starting symbol, and the like) may be agreed upon between terminals performing SL communication.

If transmission of the subchannel 1220 becomes possible at the position of the second starting symbol of the slot 0, the transmission may be performed from the position of the second starting symbol. Based on this, transmission can be performed in the slot 0, thereby reducing a COT loss. Therefore, the subchannel 1220 may be transmitted from the second starting symbol, which is a transmittable position within the slot 0. In this case, when the subchannel 1220 is transmitted from the transmittable position of the slot 0, the structure of the subchannel 1220 allows only a portion of the symbols that could be transmitted from the first starting symbol position to be transmitted. In other words, the first symbol of subchannel 1210 may be transmitted in the symbol 7 of the slot 0. However, a GUARD is required at a boundary between the slots, and in the present disclosure, it has been described that GUARD can be a flexible symbol. Accordingly, although a PSSCH should be transmitted in the last symbol of the slot 0 in case of the subchannel 1210, GUARD may be designated as a flexible symbol and can be used for purposes such as PSSCH transmission, DMRS transmission, and guard symbol.

Meanwhile, the PSCCH included in the subchannel 1220 may have the same information as the PSCCH of the subchannel 1210 to be initially transmitted. For example, the PSCCH included in the subchannel 1220 may include SCI in the slot 0, and the SCI may include time domain allocation information (e.g., TRIV), frequency domain allocation information (e.g., frequency resource indication value (FRIV)), and DMRS mapping information for the PSSCH.

In addition, according to the present disclosure, the transmitting terminal may transmit a subchannel 1230 in the slot 1 consecutively to the subchannel 1220 transmitted in the slot 0. In this case, a structure of the subchannel 1230 transmitted in the slot 1 may be the same as that of the subchannel 1210 to be transmitted in the slot 0. In this case, as described above, when two slots are transmitted in succession, the first symbol may become a flexible symbol instead of an AGC symbol. Therefore, although an AGC symbol should be transmitted in the first symbol of the slot 1 in case of the subchannel 1210, the first symbol of the slot 1 may be designated as a flexible symbol in the subchannel 1230 and can be used for purposes such as PSSCH transmission, DMRS transmission, and AGC symbol.

[C. Allocation Scheme 3]

In the allocation scheme 1 and allocation scheme 2, symbols corresponding to the position of the guard symbol in the first slot and the AGC symbol in the second slot may be defined as flexible symbols. Referring to FIG. 12, a case in which flexible symbols are configured at the position of the symbol 13 of the slot 0 and the position of the symbol 0 of the slot 1 in the second subchannel described above is exemplified.

In the present disclosure, the flexible symbol may be used for purposes such as PSSCH, DMRS, and guard. According to an exemplary embodiment of the present disclosure, a scheme of configuring the flexible symbols may be preconfigured for each resource pool. In addition, the transmitting UE may dynamically change allocation of the flexible symbols as needed. If the transmitting UE changes the flexible symbol(s), configuration information of the flexible symbol(s) may be included in SCI within the first slot.

Meanwhile, it should be noted that the present disclosure described above has been described to facilitate understanding, and is not intended to limit the present disclosure. In addition, the above description has been made only from the perspective of the transmitting UE. However, based on what has been described above, the operation at the receiving UE can be naturally understood. For example, when the transmitting UE allocates a specific resource as an SL communication resource, the allocated SL communication resource may be informed through control information.

Therefore, the receiving UE can receive the control information transmitted by the transmitting UE and identify the allocated SL communication resource based on the received control information. Then, the receiving UE may receive data through the identified SL communication resource.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a first terminal, comprising:
generating sidelink control information (SCI) including frequency resource information;
transmitting the SCI to a second terminal; and
transmitting a physical sidelink shared channel (PSSCH) on a plurality of physical resource blocks (PRBs) indicated by the frequency resource information to the second terminal,
wherein one or more PRBs in the plurality of PRBs belong to a first subchannel overlapping a first resource block (RB) set and a first guard band PRB, and the one or more PRBs used for transmitting the PSSCH are PRB(s) except for the first guard band PRB in the first subchannel.

2. The method according to claim 1, wherein frequency domain resources for transmitting the SCI and the PSSCH are configured based on a contiguous RB scheme.

3. The method according to claim 1, wherein the first subchannel overlapping the first RB set and the first guard band PRB is a highest subchannel in subchannels for the PSSCH.

4. The method according to claim 1, wherein at least one PRB in the plurality of PRBs belong to a second subchannel which does not overlap a second guard band PRB.

5. The method according to claim 1, wherein a first demodulation reference signal (DMRS) pattern of the first subchannel is identical to a second DMRS pattern of a second subchannel in subchannels for the PSSCH, and the second subchannel does not overlap with the first guard band PRB.

6. The method according to claim 1, further comprising:
performing a Listen-Before-Talk (LBT) procedure in the first RB set and a second RB set,
wherein the first and second RB sets are used for transmitting the PSSCH when the LBT procedure is successful, and the first and second RB sets are adjacent to the first guard band PRB.

7. The method according to claim 1, wherein the SCI is transmitted in a physical sidelink control channel (PSCCH), and a PRB for the PSCCH belongs to a lowest subchannel in a RB set.

8. The method according to claim 1, further comprising receiving information indicating a position of a starting symbol of sidelink (SL) transmission from a base station.

9. The method according to claim 1, wherein the first guard band PRB is not used for transmitting the SCL.

10. A method of a second terminal, comprising:
receiving sidelink control information (SCI) including frequency resource information from a first terminal;
identifying a plurality of physical resource blocks (PRBs) indicated by the frequency resource information included in the SCI; and
receiving a physical sidelink shared channel (PSSCH) on the plurality of PRBs from the first terminal,
wherein one or more PRBs in the plurality of PRBs belong to a first subchannel overlapping a first resource block (RB) set and a first guard band PRB, and the one or more PRBs used for receiving the PSSCH are PRB(s) except for the first guard band PRB in the first subchannel.

11. The method according to claim 10, wherein frequency domain resources for receiving the SCI and the PSSCH are configured based on a contiguous RB scheme.

12. The method according to claim 10, wherein the first subchannel overlapping the first RB set and the first guard band PRB is a highest subchannel in subchannels for the PSSCH.

13. The method according to claim 10, wherein a first demodulation reference signal (DMRS) pattern of the first subchannel is identical to a second DMRS pattern of a second subchannel in subchannels for the PSSCH, and the second subchannel does not overlap with the first guard band PRB.

14. The method according to claim 10, wherein the first guard band PRB is not used for transmitting the SCI.

15. The method according to claim 10, wherein the SCI is received in a physical sidelink control channel (PSCCH), and a PRB for the PSCCH belongs to a lowest subchannel in a RB set.

16. The method according to claim 10, further comprising receiving information indicating a position of a starting symbol of sidelink (SL) transmission from a base station.

17. A first terminal comprising a processor,
wherein the processor causes the first terminal to:
generate sidelink control information (SCI) including frequency resource information;
transmit the SCI to a second terminal; and
transmit a physical sidelink shared channel (PSSCH) on a plurality of physical resource blocks (PRBs) indicated by the frequency resource information to the second terminal,
wherein one or more PRBs in the plurality of PRBs belong to a first subchannel overlapping a first resource block (RB) set and a first guard band PRB, and the one or more PRBs used for transmitting the PSSCH are PRB(s) except for the first guard band PRB in the first subchannel.

18. The first terminal according to claim 17, wherein a first demodulation reference signal (DMRS) pattern of the first subchannel is identical to a second DMRS pattern of a second subchannel in subchannels for the PSSCH, and the second subchannel does not overlap with the first guard band PRB.

19. The first terminal according to claim 17, wherein the processor further causes the first terminal to perform a Listen-Before-Talk (LBT) procedure in the first RB set and a second RB set,
wherein the first and second RB sets are used for transmitting the PSSCH when the LBT procedure is successful, and the first and second RB sets are adjacent to the first guard band PRB.

20. The first terminal according to claim 17, wherein the SCI is transmitted in a physical sidelink control channel (PSCCH), and a PRB for PSCCH belongs to a lowest subchannel in a RB set.

* * * * *